United States Patent
Sakamoto et al.

(10) Patent No.: US 6,320,344 B1
(45) Date of Patent: Nov. 20, 2001

(54) POSITION CONTROL DEVICE

(75) Inventors: Keiji Sakamoto, Hachioji; Kanamasa Okuda, Sagamihara; Mitsuyuki Taniguchi, Gotenba, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/254,009

(22) PCT Filed: Jul. 1, 1998

(86) PCT No.: PCT/JP98/02965

§ 371 Date: Mar. 1, 1999

§ 102(e) Date: Mar. 1, 1999

(87) PCT Pub. No.: WO99/01927

PCT Pub. Date: Jan. 14, 1999

(30) Foreign Application Priority Data

Jul. 1, 1997 (JP) .................................................. 9-188931

(51) Int. Cl.⁷ ...................................................... G05B 19/28
(52) U.S. Cl. ........................... 318/567; 318/605; 318/606
(58) Field of Search ............................... 318/567, 568.11, 318/568.16, 602, 605–606, 630, 632, 685; 369/47–48

(56) References Cited

U.S. PATENT DOCUMENTS

| | | | |
|---|---|---|---|
| 4,503,372 | * 3/1985 | Nozawa et al. | 318/560 |
| 4,792,739 | * 12/1988 | Nakamura et al. | 318/661 |
| 4,827,203 | * 5/1989 | Sakano | 318/667 |
| 5,237,509 | * 8/1993 | Ueta et al. | 364/474.35 |
| 5,412,302 | * 5/1995 | Kido et al. | 318/685 |
| 5,525,885 | * 6/1996 | Sato | 318/632 |
| 5,905,705 | * 5/1999 | Takeda et al. | 369/48 |

FOREIGN PATENT DOCUMENTS

| | | |
|---|---|---|
| 1-270784 | 10/1989 | (JP) . |
| 5-2214 | 1/1993 | (JP) . |
| 6-327278 | 11/1994 | (JP) . |

\* cited by examiner

*Primary Examiner*—Marlon T. Fletcher
(74) *Attorney, Agent, or Firm*—Staas & Halsey LLP

(57) ABSTRACT

It is assumed that an element to be detected $2a$ in a position sensor is mounted on a rotary shaft with the center $O'$ of the element to be detected eccentric from a center of rotation $O$ by a distance d. When the rotary shaft is rotated at a fixed speed, the positions at angles 0° and 180° are accurately detected by a sensor $2b$, while the positions at angles 90° and 270°, the sensor detects the positions P1' and P3', instead of P1 and P3 which are originally to be detected, resulting in undulation of detected positions as shown in FIG. 3(b). The peak value of the unduration and an angle of rotation at which the peak value is found are determined. An amount of eccentricity d is found from the peak value, a detection error with respect to the command position (angle) is found from the amount of eccentricity d and the angle at which the peak value is found, and correction the by detection error is made with respect to the command position, providing a corrected command position to a motor.

10 Claims, 5 Drawing Sheets

POSITION CONTROL DEVICE

TECHNICAL FIELD

This invention relates to a position control device to feedback-control a position of a rotary shaft and a travel position of a movable part connected to the rotary shaft by detecting a rotational position of the rotary shaft. Particularly, the present invention relates to a position control device suitable to control a rotational position of a main spindle of a machine tool.

RELATED ART

As to a position sensor to detect a rotational position and speed of a rotary shaft, various position sensors to optically, magnetically or electrically detect a position and speed are well known. In these position sensors, an element to be detected in the position sensor is mounted to the rotary shaft so as to rotate the element to be detected together with the rotary shaft, and a rotational position of the rotary shaft is detected by optically, magnetically or electrically detecting a rotational position of the element to be detected.

When the element to be detected in the position sensor is mounted in an eccentric state or when an eccentric error caused by a mounting error occurs in case of mounting the element to be detected to the rotary shaft, the rotational position of the rotary shaft is made different from the rotational position detected by the position sensor, resulting in a reduction of detecting accuracy of the detected rotational position of the rotary shaft. For this reason, according to the prior art, an attempt has been made to mount the element to be detected to the rotary shaft exactly with precision so as to prevent any eccentric error from occurring. Also, the prior art has disregarded a position detection error caused by the eccentric error developed even if the element to be detected is mounted with precision.

When an attempt is made to control the position with high precision, there arises a problem that the position detection error caused by the eccentric error occurs in position control, and the position cannot be controlled with high precision. Further, it is restrictive and very difficult to mount the element to be detected in the sensor to the rotary shaft precisely without causing eccentricity.

DISCLOSURE OF THE INVENTION

It is an object of the present invention to provide a position control device which enables accurate position control through correction of the position detection error caused by the above eccentric error.

For attaining the above object, according to one aspect of a position control device of the present invention, there is provided a position control device which controls a position on the basis of a position feedback signal from a position sensor mounted on a rotary shaft to detect a rotational position of the rotary shaft, wherein, detection error data caused by the eccentricity or the mounting error of an element to be detected in the position sensor mounted on the rotary shaft is calculated on the basis of an output signal from the position sensor mounted on the rotary shaft and is stored in the position control device, whereby the detection error data is corrected in regard to a command rotational position for a motor which drives the rotary shaft, providing a corrected command rotational position for the motor.

Further, according to another aspect of a position control device of the present invention, there is provided a position control device which controls a position on the basis of a position feedback signal from a position sensor mounted on a rotary shaft to detect a rotational position io of the rotary shaft, wherein a program, for finding detection error data caused by the eccentricity or the mounting error of an element to be detected in the position sensor mounted on the rotary shaft is stored in the position control device, and the program is executed when a revolving speed exceeds a predetermined value so that the detection error data is automatically found on the basis of an output signal from the position sensor to be stored in a memory in the position control device, and a commanded rotational position is corrected on the basis of the stored detection error data, providing a corrected command rotational position for a motor.

According to the position control device of the present invention, even if a center of rotation of the element to be detected is made eccentric from a center of the rotary shaft due to the eccentricity of the element to be detected in the position sensor or the mounting error occurring in case of mounting the element to be detected on the rotary shaft, a command is issued to the motor which drives the rotary shaft, after correction of the eccentric error of the rotational position detected by the position sensor, whereby accurate position control is enabled.

BEST MODE OF EMBODYING THE INVENTION

Embodiment 1 of the Invention

Figure 1:
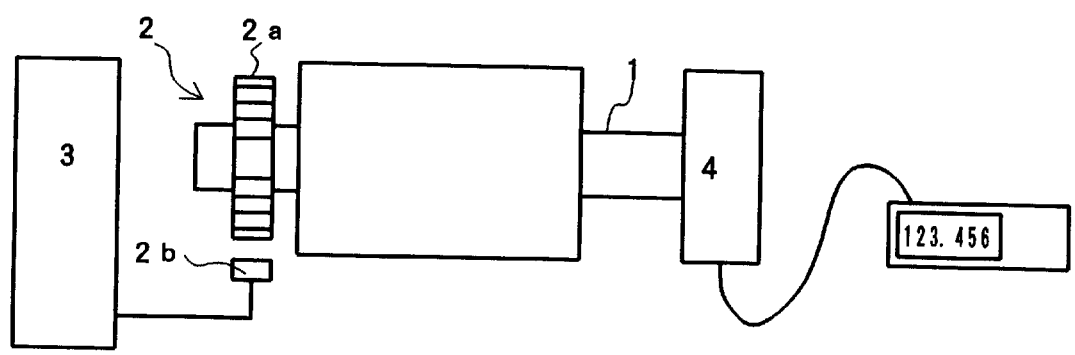
FIG. 1 is a view for explaining a mode for finding detection error data by making use of a highly-precise position sensor in one embodiment of the present invention.

FIG. 1 is a block diagram showing a method of finding detection error data caused by an eccentric error in embodiment 1 of the present invention.

In FIG. 1, reference numeral 1 denotes a main spindle of a machine tool or a rotary shaft of a motor. An element to be detected 2*a* in a position sensor 2 is mounted on the rotary shaft 1, a sensor 2*b* of the position sensor 2 is arranged close to the element to be detected 2*a*, and a rotational position of the element to be detected 2*b*, that is, a rotational position of the main spindle or the rotary shaft 1 such as a motor shaft is detected by the sensor 2*b* optically, electrically or magnetically to allow a detection signal to be fed back to a position control device 3 which controls the rotational position of the rotary shaft 1. Incidentally, the same method as the prior art is applied to detection of the rotational position of the rotary shaft 1.

In the embodiment 1, to find the detection error data, the rotary shaft 1 is mounted with a highly-precise position sensor such as an expensive highly-precise position sensor 4 having a plurality of sensors so as to enable the detection of a rotational position without being affected by the eccentricity of the element to be detected, for instance, so that the detection and display of the position are enabled by this highly-precious position sensor 4.

Then, a command for movement to a certain position is issued from the position control device 3 to a motor, which drives the rotary shaft 1, to position the rotary shaft 1 at a command position. At this time, a difference between a position detected by the highly-precise position sensor 4 and the command position is detected as detection error data caused by the eccentricity or the like of the element to be detected 2a. One revolution cycle of the rotary shaft 1 is divided into several sections, detection of the position error data is performed at a position corresponding to each point of division to find the detection error data, and the found detection error data is set and stored in a memory of the position control device 3. For instance, dividing one revolution of the rotary shaft 1 into 12 sections, respectively set are a position of a rotation angle 0° where one revolution signal is detected by the position sensor 2, and positions of rotation angles 30°, 60°, . . . 330° to obtain the detection error data, and the obtained detection error data is stored in the memory of the position control device 3 as described above.

In normal running of the position control device 3, the highly-precise position sensor 4 is removed from the rotary shaft. Then, in case of position control by controlling drive of the motor which drives the rotary shaft 1, a command position is corrected on the basis of the detection error data stored in the memory with respect to the command position, and the corrected command position is outputted as a command value of movement for the main spindle or the motor to control the position of the rotary shaft 1.

A value resulting from subtracting the command position for the motor, which drives the rotary shaft 1, from the position detected by the highly-precise position sensor 4 is stored every predetermined rotation angle within one revolution of the rotary shaft 1 as positive detection error data if the result of subtraction is positive, or as negative detection error data if the result of subtraction is negative. Then, every time the command of movement reaches the predetermined rotation angle, detection correcting data is subtracted from the command position. When a position given for the rotary shaft 1 is in the middle of the stored positions, interpolation is performed to find detection error data with respect to the command position, and correction is made by subtracting the found detection error data from the command position, providing a corrected command position of movement to the motor which drives the rotary shaft 1.

For instance, in the above embodiment, if the command position is found between the positions of the rotation angles 0° and 30°, interpolation of the detection error data stored with respect to the positions of the rotation angles 0° and 30° is performed to find detection error data in the command position, and data resulting from subtracting this found detection error data from the command position is outputted. When the detection error data is positive, output of the command position without correction allows the rotary shaft 1 to move to a position detected by the highly-precise position sensor 4. In this case, it may be understood that the rotary shaft is rotated in excess of the command position by a distance corresponding to the detection error data. However, the actual rotational position is offset by a distance for the detection error data through correction of a command position by subtracting the detection error data from the command position, resulting in the movement of the rotary shaft to an accurate position. On the contrary, when the detection error data is negative, it may be understood that the rotary shaft does not reach the command position due to a shortage of an amount of rotation corresponding to detection error data, so that this negative detection error data is subtracted from the command position to increase the command position, and then an amount corresponding to the detection error data is canceled, resulting in the movement of the rotary shaft to an accurate command position.

Correction of a pitch error of a feed screw has been carried out when position control is performed by driving a feed screw with a motor, transforming a rotary motion into a linear motion and moving a movable part of a machine tool or the like. A method of correcting the detection error data with respect to the command position is the same as the above conventional pitch error correction method.

Embodiment 2 of the Invention

Figure 2:
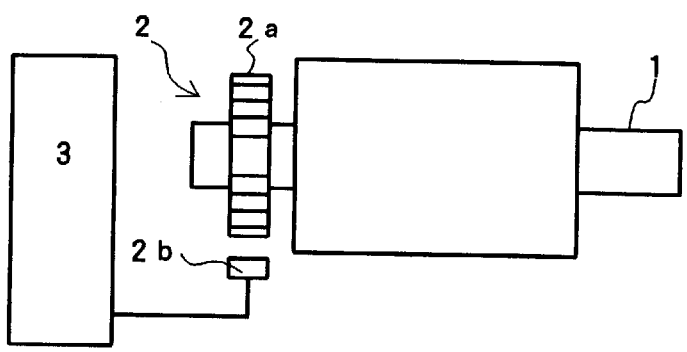
FIG. 2 is a view for explaining a mode of finding detection error data in an embodiment 2 of the present invention.

As shown in FIG. 2, according to an embodiment 2, detection error data is found by the mounted position sensor 2 itself without need of the highly-precise position sensor 4 used in the first embodiment, and the found detection error data is stored.

In the embodiment 2, when the rotary shaft 1 is rotated at a fixed speed, an amount of movement (which is an amount of movement within a certain time and, therefore, corresponds to a speed) detected within one sampling period due to an eccentric error causes undulation, so that detection error data is found on the basis of the undulation.

Figure 3A:
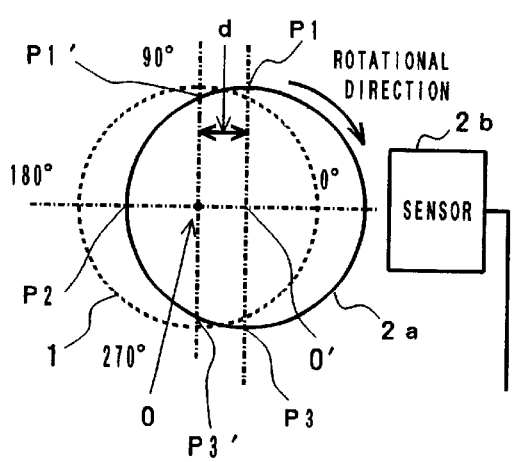
FIGS. 3A and 3B are views for explaining undulation of the error of a detected position and the error of a speed accompanying the eccentricity of a center of rotation of an element to be detected in a position sensor, respectively.
Figure 3B:
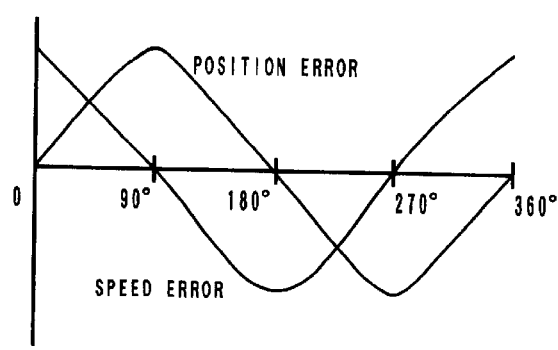

FIG. 3A is a view for explaining the occurrence of the undulation. On the assumption that the center of rotation O' of the element to be detected 2a of the position sensor 2 mounted on the rotary shaft 1 is made eccentric from the center of rotation O of the rotary shaft 1 by a distance d from the center of rotation O of the rotary shaft in a direction of a rotation angle 0°, this eccentricity causes no detection error at a position of a rotation angle 0°. However, when the rotary shaft 1 is rotated by 90°, the sensor 2b detects a position P1', instead of a position P1. Due to the eccentricity of the center of rotation O of the rotary shaft 1 from the center of rotation O' of the element to be detected 2a of the position sensor 2, the detection error is represented by P1–P1', which represents a maximum plus value. Further, at a position where the rotary shaft 1 is rotated by 180°, the sensor 2b detects a position P2, and no detection error occurs. When the rotary shaft is rotated by 270°, the sensor 2b detects a position P3', instead of a position P3. Due to the eccentricity of the center of rotation O of the rotary shaft 1 from the center of rotation O' of the element to be detected 2a in the position sensor 2, the detection error is represented by P3–P3', which shows the maximum minus value. As described above, the detection error (position error) in one revolution (from 0° to 360°) of the rotary shaft is undulated as can be represented by sine wave as shown in FIG. 3B.

On the other hand, since the position sensor 2 detects the amount of movement within one sampling period, that is, outputs the amount of movement per certain period of time, it may be considered that the position sensor also detects a speed. The radius of rotation reaches a maximum at a position of a rotation angle 0°, and, therefore, the speed is maximized (that is, the maximum speed error occurs), while the radius of rotation reaches a minimum at a position of a rotation angle 180°, and, therefore, the speed is minimized (that is, the minimum speed error occurs). On the other hand, speed error does not occur in positions of rotation angles 90° and 270°. As a result, as shown in FIG. 3B, the speed error takes the form of cosine wave-shaped undulation differing in phase by 90° from the sine wave-shaped undulation of the position error.

It is characteristic of the embodiment 2 to find a distance of eccentricity d from the amplitude of undulation of the detected speed error (that is, the amount of movement within one sampling period (a certain period of time)).

Firstly, the motor to drive the rotary shaft 1 is driven at a frequency less affected by a response of a speed loop of a control system to drive the rotary shaft 1. In the embodiment 2, for example, the rotary shaft 1 is revolved at 3750 (min$^{-1}$). That is, the rotary shaft 1 is caused to make one revolution every 16 ms. Then, a sampling period to detect the position by the position sensor 2 is set at 2 ms. In this case, detection of the position is performed eight times until the rotary shaft 1 makes one revolution (that is, every time the rotary shaft 1 is rotated by 45°).

Figure 4:
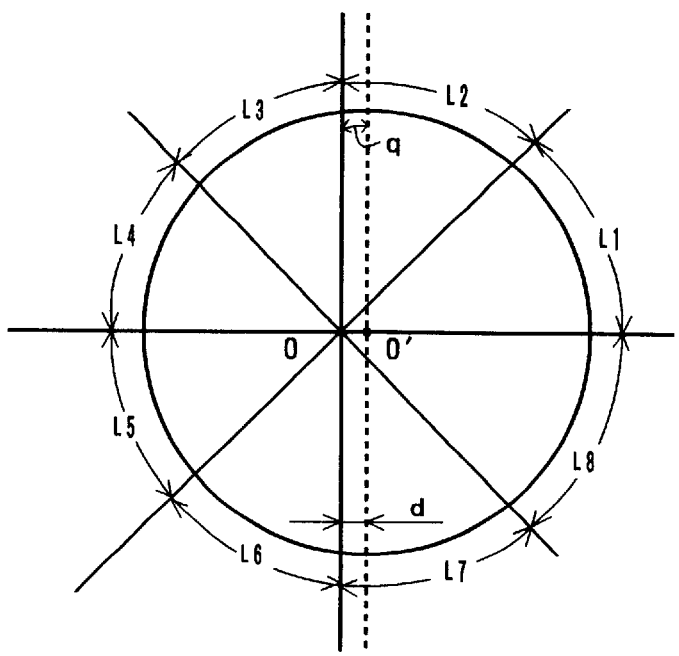
FIG. 4 is a view for explaining a principle to find an amount of eccentricity on the basis of an amount of movement detected every sampling period.

FIG. 4 is a view for explaining a principle to find the distance of eccentricity d. Reference symbol O denotes a center of rotation of the rotary shaft 1. O' denotes a center of rotation of the element to be detected of the position sensor 2, and there exists an eccentricity d between O and O'.

Referring to FIG. 4, the amount of movement detected every sampling period 2 ms is represented by L1, L2, ... L8. Further, the whole perimeter of a signal detection section of the element to be detected 2a is represented by L (L=L1+L2+ ... +L8), and a circular arc q (which is the partial length of perimeter of the signal detecting section corresponding to the amount of eccentricity d) is approximated to the amount of eccentricity d. Then, from FIG. 4, the following expressions (1) and (2) are given:

$$L7+L8+L1+L2-2d=L/2 \quad (1)$$

$$L3+L4+L5+L6+2d=L/2 \quad (2)$$

Hence, from the above expressions (1) and (2), the amount of eccentricity d is expressed as follows:

$$d=\{(L7+L8+L1+L2)-(L3+L4+L5+L6)\}/4 \quad (3)$$

In this case, an amount of movement (a certain value) within one sampling period 2 ms is Lm (FIG. 5) when no eccentricity is found between the center of rotation O of the rotary shaft 1 and the center of rotation O' of the element to be detected 2a of the position sensor 2, and a difference between each of the amounts of movement L1, L2, ..., L8 for each sampling period and Lm is represented as a movement amount error L1', L2', ..., L8'.

That is, $$L1'=L1-Lm$$

$$L2'=L2-Lm$$

$$L8'=L8-Lm \quad (4)$$

Further, Lm/2(ms) represents a command speed.

Figure 5:
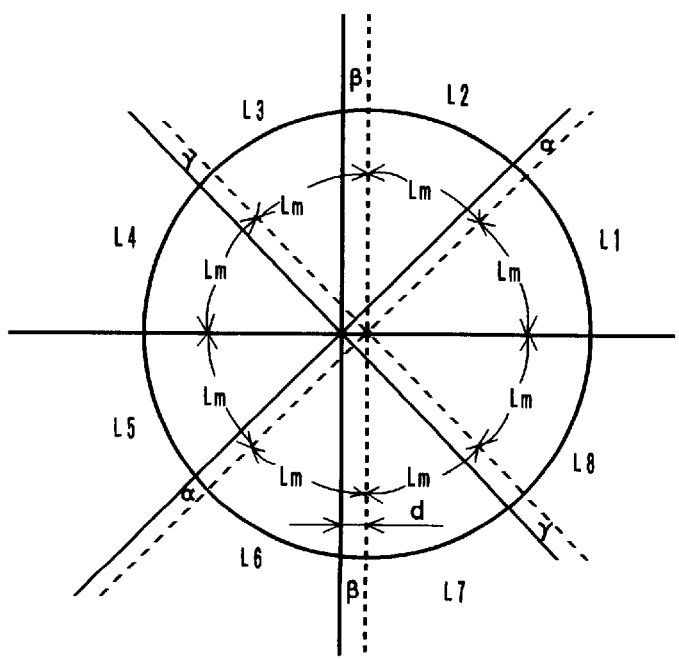
FIG. 5 is a view for explaining a principle similar to that shown in FIG. 4.

From FIG. 5 and the above expression (4), the following expressions (5) are given:

$$\alpha=L1-Lm=L1'$$

$$\alpha=Lm-L5=-L5'$$

Thus, $$L1'=-L5'$$

$$\beta=L2-(Lm-\alpha)=L2'+\alpha$$

$$\beta=Lm-(L6-\alpha)=-L6'+\alpha$$

Thus, $$L2'=-L6'$$

$$\gamma=L8-m=L8'$$

$$\gamma=Lm-L4=-L4'$$

Thus, $$L8'=-L4'$$

$$\beta=L7-(Lm-\gamma)=L7'+\gamma$$

$$\beta=Lm-(L3-\gamma)=-L3'+\gamma$$

Thus, $$L7'=-L3' \quad (5)$$

From the above expressions (3) and (5), the distance of eccentricity d is expressed as follows:

$$d=(L7'+L8'+L1'+L2')/2 \quad (6)$$

Further, from the above expressions (5), since $$L7'+L8'+L1'+L2'$$
$$=-(L3'+L4'+L5'+L6'),$$

(L7'+L8'+L1'+L2') (=2d) represents the sum of movement amount errors in a semi-circle portion of the signal detecting section of the element to be detected 2a in the position sensor 2.

Values (L1'/2 ms, L2'/2 ms, ..., L8'/2 ms) obtained by dividing L1', L2', ..., L8' in the above expression (4) by the sampling period 2 ms are speed errors.

This speed error causes undulation every period of 360° and so it may be approximated by the general expression as follows:

$$\text{Speed error}=A \sin (2\pi ft) \quad (7)$$

Further, f represents a revolving speed per second. The amplitude A in the above expression (7) represents a maximum value (a peak value) of the speed error.

Then, the sum of movement amount errors for the semi-circle portion of the signal detecting section, that is, (L7'+L8'+L1'+L2') must be found by integrating a speed error function in the above expression (7) for the semi-circle portion. However, in the above expression (7), substituting θ for 2πft gives dθ=2πfdt, and therefore, the following expression (8) is given:

$$\int A \sin(2\pi ft)dt = (A/2\pi f) \int \sin(\theta) \cdot d\theta \quad (8)$$

Integration of the expression (8) in the range of θ from π to 0 (that is, for the semi-circle portion) gives A/πf.

Thus, from the expression (6), A/πf is expressed as follows.

$$A/\pi f = (L7' + L8' + L1' + L2') = 2d$$

Thus, $$d = A/2\pi f \quad (9)$$

where A represents the amplitude of a function in the expression (7), that is, a maximum value (the peak value) of the speed error, and, thus, a maximum value among L1'/2 ms, L2'/2 ms, ..., L8'/2 ms.

If T is used for the sampling period by generalization, instead of 2 ms as in the above description, the speed error may be represented by L1'/T, L2'/T, ..., L8'/T. If the maximum value of the speed error is given as Lmax'/T (=A), the distance of eccentricity d is expressed as follows.

$$d = (Lmax'/T)/2\pi f \quad (10)$$
$$= Lmax'/(2\pi f \cdot T)$$

The following four items are only required for finding the amount of eccentricity d.

(I) the maximum value (Lmax') among detected movement amount errors L1', L2', ..., L8' within the sampling period T
(II) a time period tp (sec) from a point of generation of one revolution signal to a point of detection of the maximum value Lmax' of the movement amount error
(III) length of the circumference of the signal detecting section of the position sensor 2 (perimeter of a circle) P×dp (mm) (wherein P represents the number of units detected by the sensor, and dp represents a length of a circular arc between the detection units)
(IV) a revolving speed N (min−1) of the rotary shaft 1

When the position sensor 2 is selected, the length of the circumference of the signal detecting section in the above item (III) is determined unconditionally. Further, the revolving speed of the rotary shaft 1 in the above item (IV) represents a command revolving speed. The values in the above items (I) and (II) can be found simply by inputting a signal from the position sensor 2 to a personal computer or the like while rotating the rotary shaft at the command speed N. That is, input of one revolution signal causes a timer to be operated to find the time tp (sec) from the point of generation of one revolution signal to the point of detection of the maximum value Lmax' of the movement amount error in the above item (II) according to a timer value at a time when the maximum value of the amount of movement is detected. Dividing a value resulting from subtracting the minimum value of the detected amount of movement from the maximum value of the detected amount of movement by 2 can find the maximum value Lmax' of the movement amount error. Incidentally, dividing a mean value of the amount of movement by the sampling period T can find the command speed, and therefore, the maximum value Lmax' of the movement amount error can also be found by subtracting the amount of movement (=Lm) resulting from movement at the command speed within the sampling period T from the maximum value of the detected amount of movement.

Figure 6:
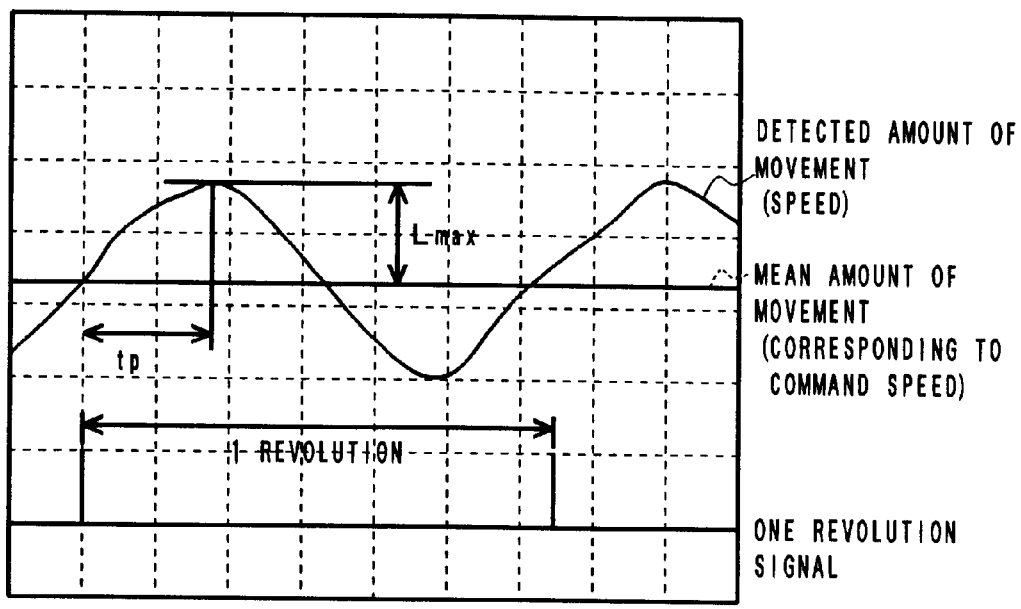
FIG. 6 is a view showing a screen, on which an amount of movement detected every sampling period is displayed.

FIG. 6 shows a display of the amount of movement (L1, L2, ...) detected every sampling period T=2 ms by rotating the rotary shaft 1 at the revolving speed N=4688 (min−1) on a display screen of a personal computer. Further, since each of the movement amount errors (L1', L2', ...; see the above expression (4)) corresponds to a value obtained by subtracting the mean amount of movement (that is, Lm corresponding to the amount of movement within the sampling period T where no eccentricity is found between the center of rotation O of the rotary shaft 1 and the center of rotation O' of the element to be detected 2a in the position sensor 2) from the amount of movement, the screen in FIG. 6 substantially shows a movement amount error.

In FIG. 6, the axis of abscissa represents a time, while the axis of ordinate represents an amount of movement (movement amount error). A division in the axis of ordinate corresponds to 1/80 of a distance dp=1.26 mm between the detection units of the signal detecting section of the position sensor 2.

From the screen shown in FIG. 6, dividing a value resulting from subtracting the minimum value (corresponding to the minimum value Lmin' of the movement amount error) of the detected amount of movement from the maximum value (corresponding to the maximum value Lmax' of the movement amount error) of the detected amount of movement, by 2, finds the maximum value Lmax' of the movement amount error. As a result, as seen from FIG. 6, the maximum value Lmax' of the movement amount error corresponds to 1.3 divisions.

That is, $$Lmax' = 1.3 \times 1.26/80$$
$$= 0.020475 \text{ (mm)}$$

Thus, from the above expression (10), the amount of eccentricity d is expressed as follows:

$$d = Lmax'/2\pi f \cdot T$$
$$= 0.020475/[2\pi \times (4688/60) \times 0.002]$$
$$\approx 0.021 \text{ (mm)}$$

Then, the time tp measured from the point of generation of one revolution signal to the point of detection of the maximum value Lmax' of the movement amount error can be determined as 3.6 ms from the displayed diagram. Further, according to FIG. 6, one revolution signal is generated at a time when the detected amount of movement is equal to the mean amount of movement Lm. However, a position where one revolution signal is generated is determined when the element to be detected 2a in the position sensor 2 is mounted to the rotary shaft 1, and therefore, it should be noted that one revolution signal is not always generated at a time when the detected amount of movement is equal to the mean amount of movement Lm.

Further, an angle sd at which the maximum value Lmax' of the movement amount error is generated is found from the screen. In FIG. 5, it is supposed that a position of generation of one revolution signal is set to be equal to a position of the rotation angle 0° of the rotary shaft 1, and a detection delay time td of the position sensor 2 is measured in advance and is set in the personal computer. The angle is determined by multiplying angular velocity ω(=2πN/60) by a time, and, therefore, is expressed as follows.

$$sd(rad) = (tp - td) \times 2\pi N/60 \quad (11)$$

where N represents the revolving speed N(min−1) of the rotary shaft 1.

Then, a value ca representing the maximum value Lmax' of the movement amount error in terms of angle by transformation is found.

This value ca represents an angle corresponding to the circular arc q shown in FIG. 4 (the length of perimeter of the signal detecting section corresponding to the amount of eccentricity d). Since the length (the perimeter of a circle) P×dp(mm) of the signal detecting section of the position sensor 2 is equivalent to $2\pi$ in terms of angle, the angle of the circular arc q is expressed as:

$$2\pi \times q/P \times dp$$

In the above expression, if q=d is assumed, the value ca is expressed as follows:

$$ca\ (rad) = 2\pi \times d/P \times dp \tag{12}$$

Then, an eccentric error $\Delta\theta$ with respect to the command angle $\theta$ may be approximated by the following expression (13).

$$\Delta\theta = ca \times \sin(\theta - sd) \tag{13}$$

In this case, it is assumed that one revolution cycle $2\pi$(rad) of the rotary shaft 1 is equally divided into n sections, and the eccentric error $\Delta\theta 0$, $\Delta\theta 1$, $\Delta\theta 2$, $\Delta\theta 3$, ... $\Delta\theta n-1$ occurs every time the angle advances by an angle $2\pi/n$. If an eccentric error at the command angle $\theta i$ is represented by $\Delta\theta i$, an eccentric error $\Delta\theta i+1$ at a command angle $\theta i+1$ where angle $2\pi/n$ advanced from the command angle $\theta i$ is equal to a value resulting from adding the eccentric error $\Delta\theta i$ with respect to the previous command angle $\theta i$ to an increment ($\Delta\theta i+1-\Delta\theta i$).

That is, from the above expression (13), the increment, i.e., a difference ($\Delta\theta i+1-\Delta\theta i$) of the eccentric error $\Delta\theta$ is expressed as follows:

$$ca\ \{\sin(\theta i+1-sd)-\sin(\theta i-sd)\} \tag{14}$$

wherein i represents a value in the range of 0 to n−1.

Then, it is assumed that the rotary shaft 1 is rotated at revolving speed N=4688 (min-1), sampling (position detection) is performed eight times while the rotary shaft 1 makes one revolution (that is, every time the rotary shaft 1 is rotated by 45°), td=2.1 ms is given as the detection delay time of the position sensor 2, P dp=256 1.26 mm is given as the length of the signal detecting section (the perimeter of a circle), and as a result, data as shown in FIG. 6 is obtained. That is, Lmax'=0.020475 (mm) is given, and the time tp measured from the point of generation of one revolution signal to the point of detection of the maximum value Lmax' of the movement amount error is 3.6 ms. As a result, if d≈0.021 (m) is given from the above expression (10), the value ca representing the maximum value Lmax' of the movement amount error in terms of angle by transformation is found from the above expression (12) as follows:

$$ca\ (rad) = 2\pi \times 0.021 / (256 \times 1.26)$$

$$= 0.132\ rad\ (= 0.023°)$$

Further, from the above expression (11), the position (the angle sd) where the maximum value Lmax' of the movement amount error is generated is found as follows:

$$sd\ (rad) = (3.6 - 2.1) \times 2\pi \times 4688/60$$

$$= 736.39\ (= 42.2°)$$

Then, the difference ($\Delta\theta i+1-\Delta\theta i$) in eccentric error for each 45° is expressed from the above expression (14) as follows:

$$0.023\{\sin(45° \times (i+1)-42.2°)-\sin(45° \times i)-42.2°)\}$$

Thus, the difference in eccentric error by substituting a value in the range of 0 to 7 for i is as follows:

| i | $\theta$ | difference in eccentric error |
|---|---|---|
| 0 | 0° | 0.008° |
| 1 | 45° | 0.017° |
| 2 | 90° | 0.016° |
| 3 | 135° | 0.006° |
| 4 | 180° | −0.008° |
| 5 | 225° | −0.017° |
| 6 | 270° | −0.016° |
| 7 | 315° | −0.006° |

After the found differences in eccentric error as described above are set and stored in the memory of the position control device 3, the rotary shaft is driven according to a movement command given to the motor by correcting (subtracting) the stored difference in eccentric error with respect to the movement command given to the motor according to a method similar to correction of a pitch error of a feed screw in the prior art which has been performed in case of driving the motor while controlling the position of the movable part with the feed screw driven by the motor. As a result, it becomes possible to perform accurate position control by correcting the position detection error caused by the eccentricity due to the mounting error or the like of the position sensor.

In the embodiment 2 described above, the personal computer is used for calculation of the detection error data. However, instead of using the personal computer, it may be configured that with the program for finding the detection error data is stored in the position control device 3 itself, which is mounted with the position sensor for controlling the position of the rotary shaft on the basis of the position sensor, and with the position sensor 2 mounted on the rotary shaft 1, the detection error data is automatically found and then stored in the memory of the position control device 3 by executing the program when the position control device is set up.

Figure 7:
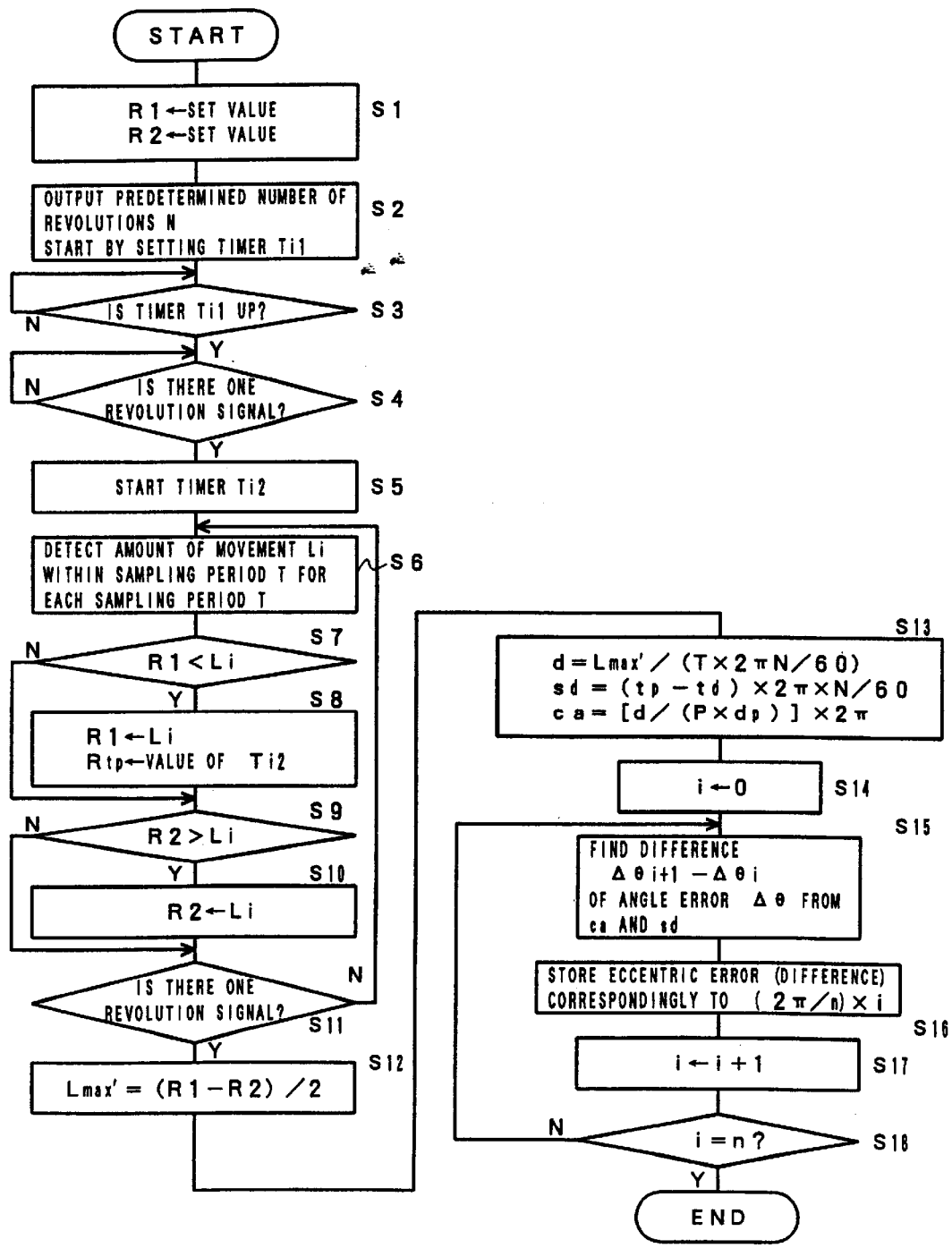
FIG. 7 is a flow chart of a program for finding detection error data in one embodiment of the present invention.

FIG. 7 is a flow chart of a program for the processing executed by the personal computer or the position control device 3 to find detection error data. In FIG. 7, the description is mainly concerned with a case where the processing is executed by the position control device 3.

When the position control device 3 receives a command which requires obtaining the detection error data, a processor of the position control device 3 starts the processing shown in FIG. 7.

First, the processor sets a first predetermined value (for instance, an estimated mean amount of movement Lm or a value slightly smaller than Lm) in a register R1 storing the maximum value of the amount of movement L1 within the sampling period, and also sets a second predetermined value (for instance, an estimated mean amount of movement Lm or a value slightly greater than Lm) in a register R2 storing the minimum value (Step S1). Subsequently, the processor outputs the predetermined number of revolutions N which is too high in speed to enable a speed loop for controlling the predetermined revolving speed of the rotary shaft 1, rotates the motor to drive the rotary shaft 1 at the revolving speed N, and sets a predetermined time in a timer Ti1 (Step S2). Incidentally, when the personal computer is used for the execution of the processing to find the detection error data, the predetermined number of revolutions N is outputted from the personal computer to the position control device 3 to allow the position control device 3 to drive the motor which drives the rotary shaft 1. The predetermined time is not less than a time period from a point when the command of the predetermined number of revolutions N is issued to a point when the rotary shaft 1 reaches the predetermined number of revolutions N to hold the speed constant.

Then, the processor checks whether or not the timer Ti1 is up (Step S3). When the timer times up, the processor monitors whether or not one revolution signal is inputted from the position sensor 2 (Step S4). When one revolution signal is inputted, the processor starts a timer Ti2 (Step S5), and starts the processing to detect the amount of movement Li (L1, L2, . . . ) detected every sampling period T(ms) (Step S6). The processor compares the detected amount of movement Li within the sampling period T with the value stored in the register R1 (Step S7). When the detected amount of movement Li is greater than the stored value, the processor stores the detected amount of movement Li in the register R1, and also stores a value of the timer Ti2 in a register Rtp storing the time period tp from the point of generation of one revolution signal to the point of detection of the maximum value Lmax' of the movement amount error (Step S8). Further, when the detected amount of movement Li is not more than the value stored in the register R1, the processor advances the processing to Step S9 without executing the processing in Step S8.

In Step S9, the processor compares the detected amount of movement Li with the value stored in the register R2. When the detected amount of movement Li is smaller than the stored value, the processor stores the detected amount of movement Li in the register R2 (Step S10). Further, when the value stored in the register R2 is smaller than the detected amount of movement Li, the processor advances the processing from Step S9 to Step S11 without executing the processing in Step S10. In Step S11, the processor checks whether or not one revolution signal is inputted, and when no one revolution signal is inputted, the processor returns the processing to Step S6 to repeatedly execute the processing from Steps S6 to S11. Then, when one revolution signal is detected in Step S11, the processor advances the processing to Step S12. As a result, the maximum value Lmax of the amount of movement Li in a section from one revolution signal to the next one revolution signal, that is, in one revolution cycle of the rotary shaft 1 is stored in the register R1, and the minimum value Lmin of the amount of movement is stored in the register R2. Further, the time period from the point of generation of one revolution signal to the point of detection of the maximum value Lmax of the amount of movement Li is stored in the register Rtp. Further, the detection of the maximum value Lmax of the amount of movement Li is equivalent to that of the maximum value Lmax' of the movement amount error (See the above expression (4)), and, as a result, the time period tp from the point of generation of one revolution signal to the point of detection of the maximum value Lmax' of the movement amount error is stored in the register Rtp.

Then, the processor finds the maximum value Lmax' of the movement amount error by dividing a value resulting from subtracting the minimum value Lmin of the amount of movement stored in the register R2 from the maximum value Lmax of the amount of movement Li stored in the register R1, by 2 (Step S12). That is, the processor performs the following calculation.

Lmax'=(Lmax−Lmin)/2

Then, the processor finds the amount of eccentricity d, the angular position sd to generate the maximum value Lmax' of the movement amount error and the value ca representing the maximum value Lmax' of the movement amount error in terms of angle by transformation by performing the operation according to the above expressions (10), (11) and (12), on the basis of the maximum value Lmax' of the movement amount error, the time period tp from the point of generation of one revolution signal to the point of detection of the maximum value Lmax of the amount of movement Li, the predetermined number of revolutions N, the sampling time T, the detection delay time td of the position sensor 2 and length of one perimeter, P×dp, of the signal detecting section of the position sensor 2 (Step S13).

Then, the processor sets an index i at "0" (Step S14), finds a difference ($\Delta\theta i+1-\Delta\theta i$) in eccentric error $\Delta\theta$ corresponding to the angle $\theta i(=(2\pi/n)\times i)$ by performing the operation according to the above expression (14) on the basis of the value ca representing the maximum value Lmax' of the movement amount error in terms of angle by transformation, the angle sd to generate the maximum value Lmax' of the movement amount error and the number of divisions (the number of found detection error data) n of predetermined one revolution, and then stores the difference in the memory (Steps S15 and S16).

Subsequently, the processor increases the index i by 1 (step S17), checks whether or not the index i has reached the predetermined number of divisions n (Step S18), and repeatedly executes the processing from Step S15 to S18 when the index i has not reached the predetermined number of divisions n, or ends the processing when the index i has reached the predetermined number of divisions n. As a result, the detection error data with respect to each rotation angle resulting from equally dividing the rotary shaft 1 into n sections is stored in the memory (or the memory of the personal computer when used) of the position control device 3.

Further, when the above processing is executed by the personal computer, the detection error data for each rotation angle stored in the memory of the personal computer is displayed on a display or the like, and the displayed data may be set in the memory of the position control device 3.

Further, according to the embodiment 2, the detection error data is found by driving the motor, which drives the rotary shaft, at a fixed revolving speed which would disable the speed loop. However, in case of using an induction motor, it may be possible to find the detection error data by rotating the induction motor through excitation at a fixed frequency while keeping the speed loop open. In this case, too, the detection error data may be found by making use of the personal computer, or may be automatically found from the program for finding the detection error data stored in the position control device 3 itself. In this case, the program for finding the detection error data, output of excitation command of a fixed frequency is substituted for processing to output the predetermined number of revolutions N in Step S2 shown in FIG. 7. Further, the processing for calculating the number of revolutions N of the rotary shaft 1 is required between Steps S3 and S4. That is, it is necessary to calculate a value of the number of revolutions N on the basis of a signal from the position sensor 2 after waiting until the revolving speed becomes constant following the output of the excitation command of the fixed frequency. The other processing is similar to that shown in FIG. 7.

Further, in each embodiment described above, the command to find the detection error data is inputted to the personal computer or the position control device 3, and the detection error data is found in advance before the start of normal running of the position control device 3. Otherwise, after the program to find the detection error data is stored in the position control device 3 in advance, the program to find the detection error data may be executed when the rotary shaft 1 reaches the number of revolutions N not less than a predetermined value. In this case, in the processing shown in FIG. 7, the processing in Steps S2 and S3 are not required.

What is claimed is:

1. A position control device, comprising:

a position sensor mounted on a rotary shaft to detect a rotational position of the rotary shaft and generate a position feedback signal to control the rotational position; and a processor to receive an output signal from the position sensor and to calculate detection error data caused by eccentricity or mounting error of an element mounted on the rotary shaft detected by the position sensor, to store the detection error data in the position control device, and to correct the detection error data corresponding to a rotation angle from a certain position of the rotary shaft with respect to a command rotational position of a motor for driving the rotary shaft, thus providing a corrected command rotational position for the motor.

2. A position control device according to claim 1, wherein the detection error data is calculated automatically based on the output signal from the position sensor and stores the detected detection error data in a memory of the position control device, by executing a detection error data finding program previously stored in the position control device.

3. A position control device according to claim 1, wherein the detection error data is calculated based on an amount of undulation, which occurs once in each revolution, in an output signal from the position sensor and a time ranging from output of one revolution signal from the position sensor to the peak of the undulation, by rotating the rotary shaft at a sufficient fixed speed which does not cause a speed loop, which controls driving the motor to follow.

4. A position control device according to claim 1, wherein the motor is an induction motor, and the detection error data is calculated based on an amount of undulation, which occurs once for each revolution, of the output signal from the position sensor and a time ranging from output of one revolution signal from the position sensor to the peak of the undulation, where the induction motor is rotated at a fixed speed by excitation at a fixed frequency on condition that a speed loop is kept open.

5. A position control device, comprising:

a position sensor mounted on a rotary shaft to detect a rotational position of the rotary shaft and produce a position feedback signal to control the position; and a program to find data on detection error caused by eccentricity or mounting error of an element to be detected by the position sensor mounted on said rotary shaft, wherein the program is executed when a revolving speed of the shaft becomes not less than a predetermined speed, so that the detection error data is automatically obtained based on an output signal from the position sensor and is then stored in a memory of the position control device, and a command rotational position is corrected based on the stored detection error data, providing a corrected command for rotational position of the motor.

6. A position control method, comprising:

rotating a rotary shaft on which is fixed an element to be detected by a position sensor, at a predetermined revolving speed, monitoring a signal detecting portion of the element to be detected at predetermined sampling periods, and finding an amount of movement within a sampling period;

finding a maximum value and a minimum value among the amounts of movement during one revolution of the element to be detected;

finding a time period from a point of reception of one revolution signal from the detected element to a point of detection of the maximum value among the amounts of movement;

determining an error with respect to a command angle based on the predetermined revolving speed, the sampling period and at least one of the maximum value, minimum value, and time period; and equally dividing the rotary shaft into n sections, n being an integer of not less than 1, to find an amount of correction for canceling the error, and adding the amount of correction to the movement command for the motor which drives the rotary shaft, every time the rotary shaft is advanced by an angle 2"/n.

7. A position control method according to claim 6, wherein the amount of correction is a value corresponding to a difference between an error in a certain command angle and the error in an angle resulting from advancing the rotary shaft from the command angle by 2"/n.

8. A position control device to control a rotational position of a rotary shaft, comprising:

a rotatable shaft with an element mounted thereon;

a motor to drive said rotatable shaft;

a position sensor positioned adjacent said element so as to detect detection error data of an eccentricity or mounting error of said element as mounted on said rotatable shaft;

a calculator to calculate the detection error data based on an output signal of said position sensor and a detected rotational position of the rotatable shaft;

a storage device to store said detection error data; and a correction device to provide a command rotational position for said motor driving said rotatable shaft corrected for said calculated detection error data.

9. A position control device to control a rotational position of a rotary shaft, comprising:

a rotatable shaft with an element mounted thereon;

a motor to drive said rotatable shaft; and a position sensor positioned adjacent said element so as to detect detection error data of an eccentricity or mounting error of said element as mounted on said rotatable shaft, wherein said position control device calculates the detection error data based on an output signal of said position sensor and a detected rotational position of the rotatable shaft, stores said detection error data, and provides a command rotational position signal for said motor driving said rotatable shaft that is corrected for said detected error data.

10. A method for controlling the position of a rotating shaft comprising:

rotating a shaft with an element mounted thereon with a motor;

detecting detection error data of an eccentricity or mounting error of the element mounted on the rotating shaft with a position sensor mounted adjacent to the detecting element by calculating the detection error data based on an output signal of the position sensor and a detected rotational position of the rotatable shaft, and storing the detection error data; and generating a command rotational position signal that has been corrected for the detection error data to drive the motor rotating shaft.

* * * * *

UNITED STATES PATENT AND TRADEMARK OFFICE
CERTIFICATE OF CORRECTION

PATENT NO.    : 6,320,344 B1
DATED         : November 20, 2001
INVENTOR(S)   : Keiji Sakamoto et al.

It is certified that error appears in the above-identified patent and that said Letters Patent is hereby corrected as shown below:

<u>Title page,</u>
Item [75], change "Hachioji" to -- Tokyo --.

<u>Column 8,</u>
Line 37, change "≈" to -- ≡ --.

<u>Column 9,</u>
Line 47, change "≈" to -- ≡ --.

<u>Column 10,</u>
Line 54, change "L1" to -- Li --.

Signed and Sealed this

Sixth Day of August, 2002

*Attest:*

*Attesting Officer*

JAMES E. ROGAN
*Director of the United States Patent and Trademark Office*